UNITED STATES PATENT OFFICE.

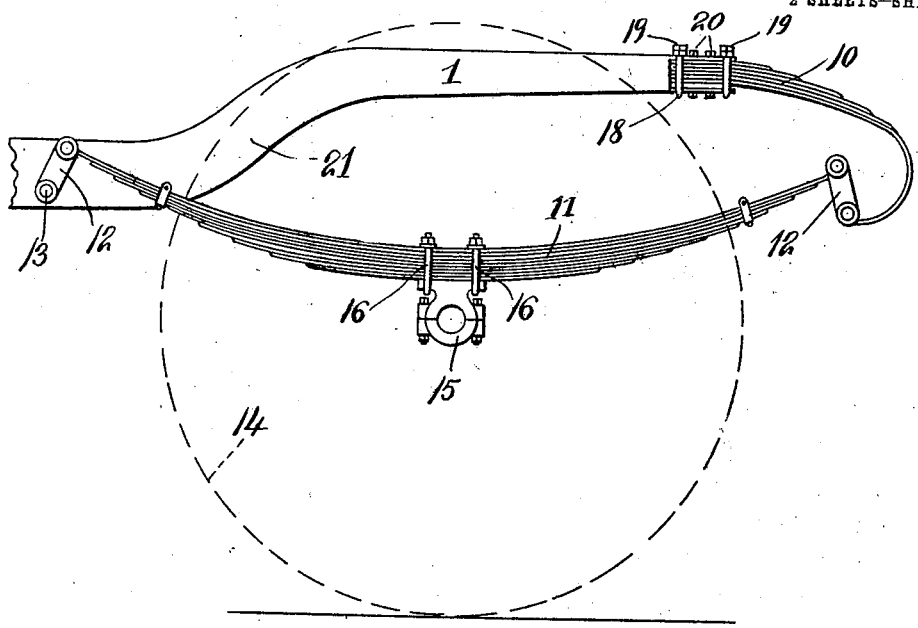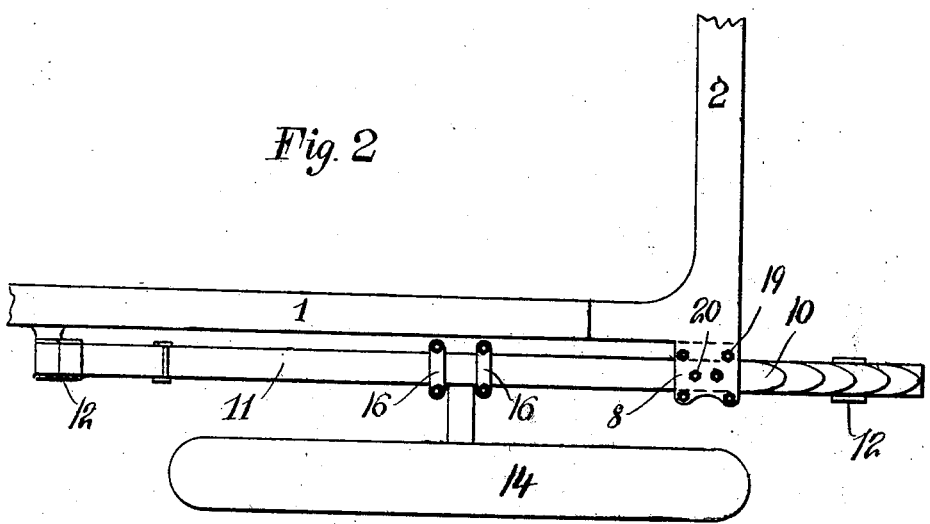

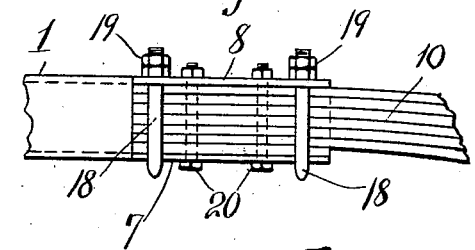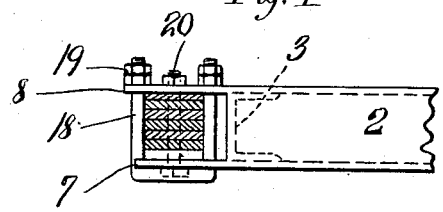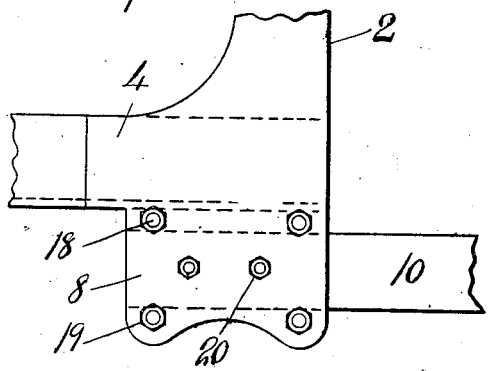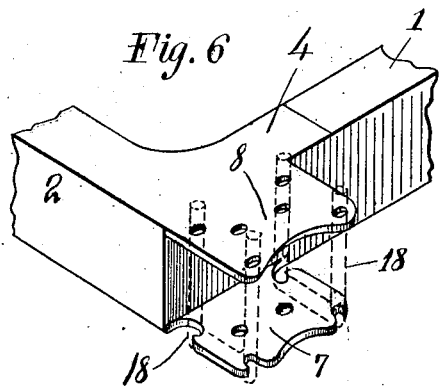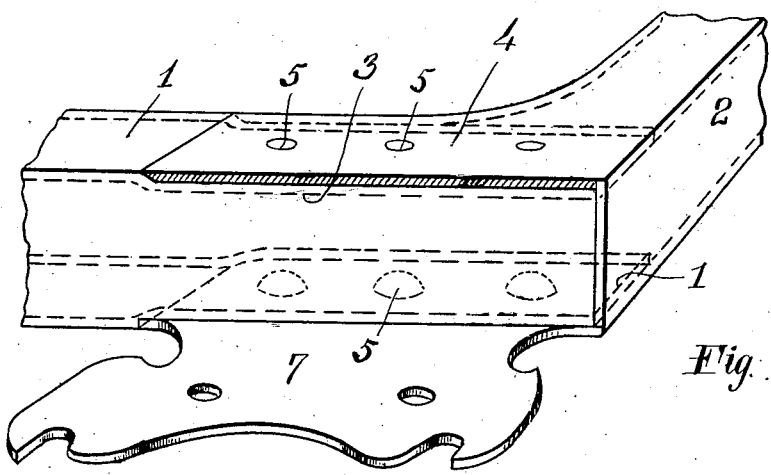

GUIDO FORNACA, OF TURIN, ITALY, ASSIGNOR, BY MESNE ASSIGNMENTS, TO F. I. A. T., OF POUGHKEEPSIE, NEW YORK, A CORPORATION OF NEW YORK.

VEHICLE-FRAME SUSPENSION.

979,278.      Specification of Letters Patent.      Patented Dec. 20, 1910.

Application filed February 17, 1909. Serial No. 478,457.

*To all whom it may concern:*

Be it known that I, GUIDO FORNACA, a subject of the King of Italy, residing at Turin, in the Province of Piedmont and Kingdom of Italy, have invented certain new and useful Improvements in Vehicle-Frame Suspension, of which the following is a full, clear, and exact specification.

This invention relates to vehicle frame suspension and more particularly has reference to improvements in the manner of constructing and attaching the rear frame of an automobile to the rear springs and the rear axle.

In order that the vehicle may be easy riding, it is not only desirable that the springs be of considerable length and as far apart as possible, but the frame should be hung low, and the wheel base, or distance between the wheels, be as long as possible. Where semi-elliptic springs are used, if made sufficiently long to ride easily, the wheel base must either be shortened or the frame extended by heavy extensions to carry the rear ends of the springs. This requires strengthening of the frame and increases the weight, as well as cost of manufacture, while if springs other than semi-elliptic are used, such as three-quarter elliptic, to give smoother riding qualities, the frame may be raised objectionably high.

This invention has for its objects to provide a light, but strong and rigid frame construction, and also to permit the frame to be hung low on widely placed outside springs other than semi-elliptic, such as three quarter elliptic springs herein shown. By this invention, the springs can readily be attached and detached, and do not interfere with the body.

The invention will be more fully understood in connection with the description of the accompanying drawings wherein—

Figure 1 represents in side elevation a portion of the rear end of a vehicle embodying the invention; Fig. 2 is a plan view; Figs. 3, 4, 5, and 6 are detailed views showing the manner of attaching the springs and Fig. 7 is an enlarged detail showing the manner of joining the side and back portions of the frame.

The invention is especially applicable to vehicle frames composed of channel bars and, as herein shown, comprises a pair of oppositely disposed U-shaped side bars 1 and end bars 2 connected therewith in the manner shown in Fig. 7. The sides 1 are channeled or U-shaped in cross section and at the rear end are drawn down as at 3 so as to be embraced by the upper and lower flanges or extensions 4 formed on the end pieces 2. To secure the parts together rivets or other suitable fastenings may be employed.

7 and 8 are integral extensions of the flanges of end pieces 2, projecting laterally beyond the sides 1.

Between the extensions 7 and 8 is clamped a spring 10, which is connected by a link 12 to one end of a semi-elliptic spring 11, the other end of the spring 11 being connected to the frame by means of a second link 12 pivoted at 13. The springs 10 and 11, as herein shown, constitute what is known as a three quarter elliptic spring. The spring 11 carries intermediate its ends, an axle 15 carrying wheel 14, the axle 15 being secured to the spring 11 by clips 16, or in any other approved manner.

As will be seen, the springs 10 and 11 are composed of a number of leaves, and the leaves of spring 10 are preferably clamped between the extensions 7 and 8 of the end piece 2 by bolts or clamps 18 having nuts 19. It will be observed that the bolts 18 do not pass through the leaves of the spring 10, though, if desirable, additional bolts 20 carried by the extensions 7 and 8 can be provided, passing through the leaves of the spring.

It will be observed that the side bars 1 are dropped or bent in front of the axle, as at 21, this being for the purpose of permitting the entrance of the body to be lower than would otherwise be possible and it also provides that the attachment of the front end of spring 11 to the side 1 will not raise the frame too high.

It is desirable that the body be hung as low as possible on the springs, and that the springs be as widely separated as possible, in order to reduce the tendency to sidewise swaying. At the same time the spring should not be attached at the rear to the frame in such a manner that the body will have to be altered or raised above the plane of the frame. These results are attained herein since the top of the frame is within and at or below the upper spring. Also, it will be seen that the extensions 7 and 8 between which the short spring 10 is clamped are integral parts of the end frame 2 which extensions are, to a certain extent, reinforced by the reduced ends 3 of the sides 1 which extend as shown in Fig. 7 within the extensions 4 of the end frame 2 up to the back of the end frame 2, thereby forming a very rigid and strong structure with a small amount of metal and without requiring the use of solid parts or forgings. This forms a flush joint, which is of advantage because the body can be more easily fitted on the frame, and more solidly held. Such a construction, aside from its lightness and strength, has advantages in its cheapness, being entirely made of plate metal, riveted together where desirable.

It will be seen that one spring can be easily removed and another substituted without disturbing the body. It will further be seen that changes in the length of springs will not require change in the length of wheel base, lengthening of the rear spring support, or other special modification of the frame, so that long or short springs may be employed as desired to suit a particular requirement.

I claim—

1. In a vehicle frame suspension, a channeled side member and a channeled cross member secured to each other, one of said members being reduced at the end on both sides to pass between the flanges of the other member, the flanges of said latter member having integral extensions projecting longitudinally of the other member and embracing the reduced portion thereof to form a flush over-lapped joint, and a spring attached to said frame parallel to said side member.

2. In a vehicle frame construction, a channeled side member and a channeled end member, the side member being reduced at the end to pass between the flanges of the end member and against the web, flange extensions on the end member extending laterally outside the side member, fastening means, and a spring held between said extensions and extending longitudinally of the side frame.

3. In a vehicle frame construction, a channeled side member, a channeled end member, the side member being reduced at the end to pass between the flanges and against the web of the end member, said end member being riveted to the side member, and having extensions projecting beyond the side member, and a three-quarter elliptic spring clamped at the end between said extensions by bolts carried thereby and secured at the front to the side member.

4. In automobile frame construction, a side member, an end member secured thereto and extending beyond the side member and a side spring attached to the extension of the end member and to the side member.

5. In automobile frame construction, a side member having its end higher than the intermediate portion, an end member secured to the end of said side member and extending beyond the side member, and a side spring attached at one point to the extension of the end member and at another point to the intermediate portion of said side frame.

6. In automobile frame construction, a channeled side member and a channeled end member secured to each other to form a corner, a pair of separated plates projecting laterally beyond the side member, and a spring secured between said plates and extending in the direction of the side frame.

7. In automobile frame construction, a side member, an end member secured to said side member to form a corner of the frame, a side spring outside said frame and parallel to said side member, means for pivoting said spring at its forward end to said side member, a wheel axle intermediately attached to the middle portion of said spring, and a second spring secured to the frame rearwardly of the point of attachment of said first spring and connected at its rear end to the rear end of said first spring.

8. In automobile frame construction, a side member having its rear end higher than the intermediate portion, an end member secured to the end of said side member to form a corner of the frame, a side spring outside said frame and parallel to said side member, means for pivoting said spring at its forward end to the intermediate portion of said side member, a wheel axle intermediately attached to the middle portion of said spring, and a second spring secured to the frame rearwardly of the point of attachment of said first spring and connected at its rear end to the rear end of said first spring.

In testimony whereof I affix my signature, in presence of two witnesses.

GUIDO FORNACA.

Witnesses:
J. S. JOSEPHS,
LOUIS ALLAN.